(12) United States Patent
Lee et al.

(10) Patent No.: US 11,400,851 B2
(45) Date of Patent: Aug. 2, 2022

(54) BREATHER VALVE

(71) Applicant: UNICK CORPORATION, Gyeongsangnam-do (KR)

(72) Inventors: Chang-Hoon Lee, Gyeongsangnam-do (KR); Eui-Dong Roh, Busan (KR); Jung-Tae Kim, Busan (KR); Ji-Yong Lee, Gyeongsangnam-do (KR)

(73) Assignee: UNICK CORPORATION, Gyeongsangnam-do (KR)

( * ) Notice: Subject to any disclaimer, the term of this patent is extended or adjusted under 35 U.S.C. 154(b) by 95 days.

(21) Appl. No.: 16/992,622

(22) Filed: Aug. 13, 2020

(65) Prior Publication Data

US 2021/0129730 A1  May 6, 2021

(51) Int. Cl.
| | | |
|---|---|---|
| *F16K 1/04* | (2006.01) | |
| *B60P 3/22* | (2006.01) | |
| *F16K 15/06* | (2006.01) | |
| *F16L 55/11* | (2006.01) | |
| *F16L 55/07* | (2006.01) | |

(52) U.S. Cl.
CPC ............ *B60P 3/2255* (2013.01); *F16K 15/06* (2013.01); *F16L 55/07* (2013.01); *F16L 55/1108* (2013.01); *F16K 2200/102* (2021.08)

(58) Field of Classification Search
CPC ......... F16L 55/1108; F16L 55/07; F16K 1/04; F16K 2200/102; F17C 2221/012
USPC ..................... 138/89, 94; 251/172
See application file for complete search history.

(56) References Cited

U.S. PATENT DOCUMENTS

| | | | | |
|---|---|---|---|---|
| 3,893,487 | A * | 7/1975 | Engelking | B65D 39/08 220/304 |
| 4,986,502 | A * | 1/1991 | Ceroke | F16K 51/00 251/351 |
| 5,785,082 | A * | 7/1998 | Geis | F02M 21/023 137/516.29 |
| 6,029,683 | A * | 2/2000 | Moebs | F16K 1/307 137/15.01 |
| 8,100,149 | B2 * | 1/2012 | Keiser | G01K 1/146 73/866.5 |
| 9,599,225 | B2 * | 3/2017 | Nohara | F16J 13/12 |
| 10,641,425 | B2 * | 5/2020 | Takezawa | F16K 1/385 |
| 2008/0202596 | A1 * | 8/2008 | Kato | F16L 55/1108 137/197 |

FOREIGN PATENT DOCUMENTS

| | | |
|---|---|---|
| JP | 2008014474 A | 1/2008 |
| JP | 2018132072 A | 8/2018 |
| KR | 1020050050630 A | 5/2005 |
| KR | 200442477 Y1 | 11/2008 |
| KR | 100873244 | 12/2008 |

* cited by examiner

*Primary Examiner* — Kevin F Murphy
(74) *Attorney, Agent, or Firm* — Kinney & Lange, P.A.

(57) ABSTRACT

Disclosed is a breather valve for controlling a pressure of a transfer channel of a valve assembly. The valve assembly controls charging and discharging of hydrogen in a hydrogen fuel cell-based vehicle. The breather valve includes a vent ring movably received in a distal portion of the transfer channel and having a ventilation hole communicating with a main portion of the transfer channel; and a vent valve received in the distal portion of the transfer channel and screw-coupled to the transfer channel to open or close the ventilation hole.

5 Claims, 3 Drawing Sheets

[FIG. 1]
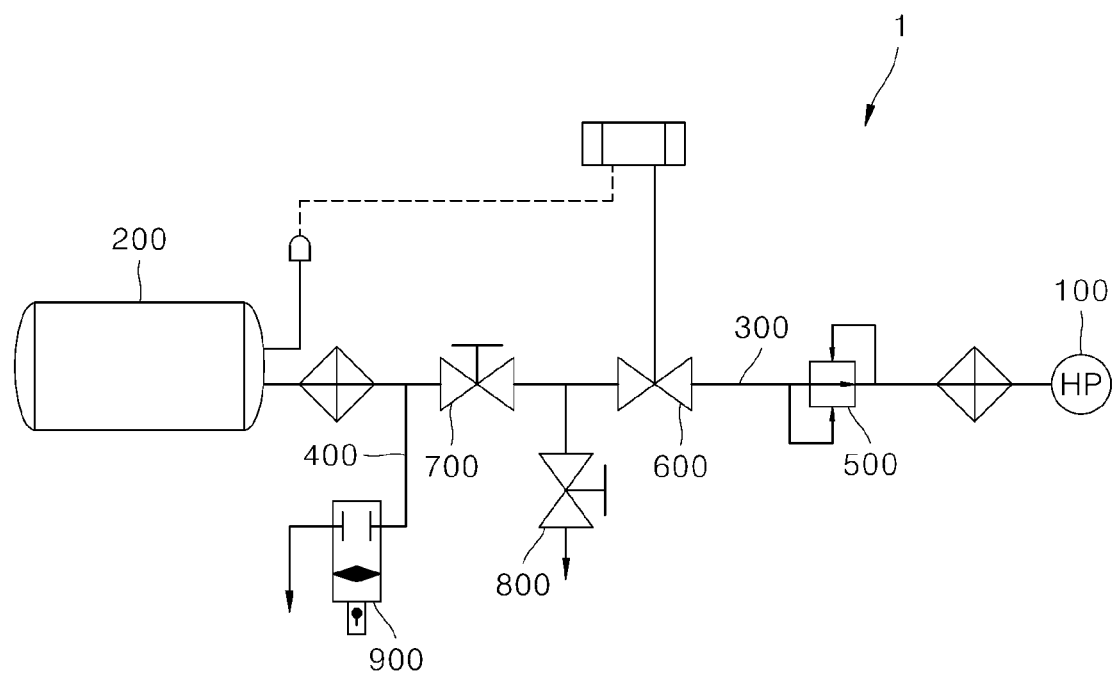

【FIG. 2】
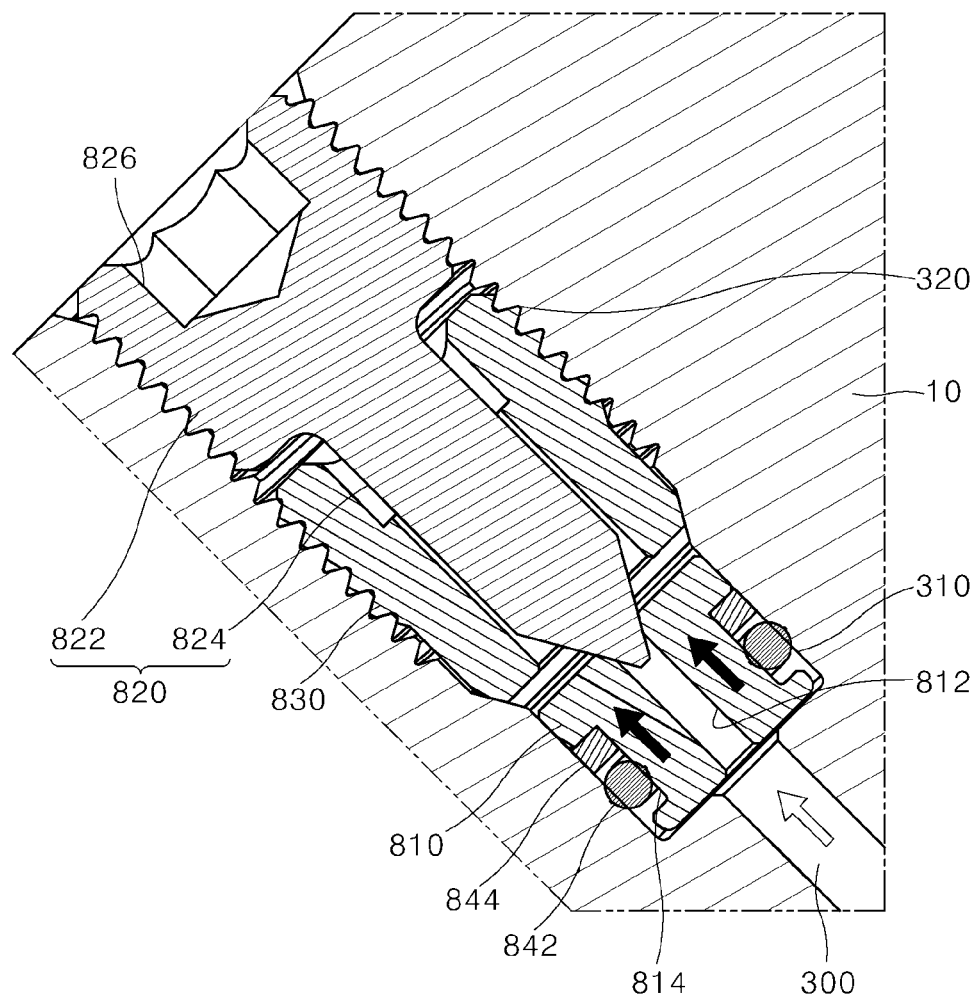

[FIG. 3]
Prior Art
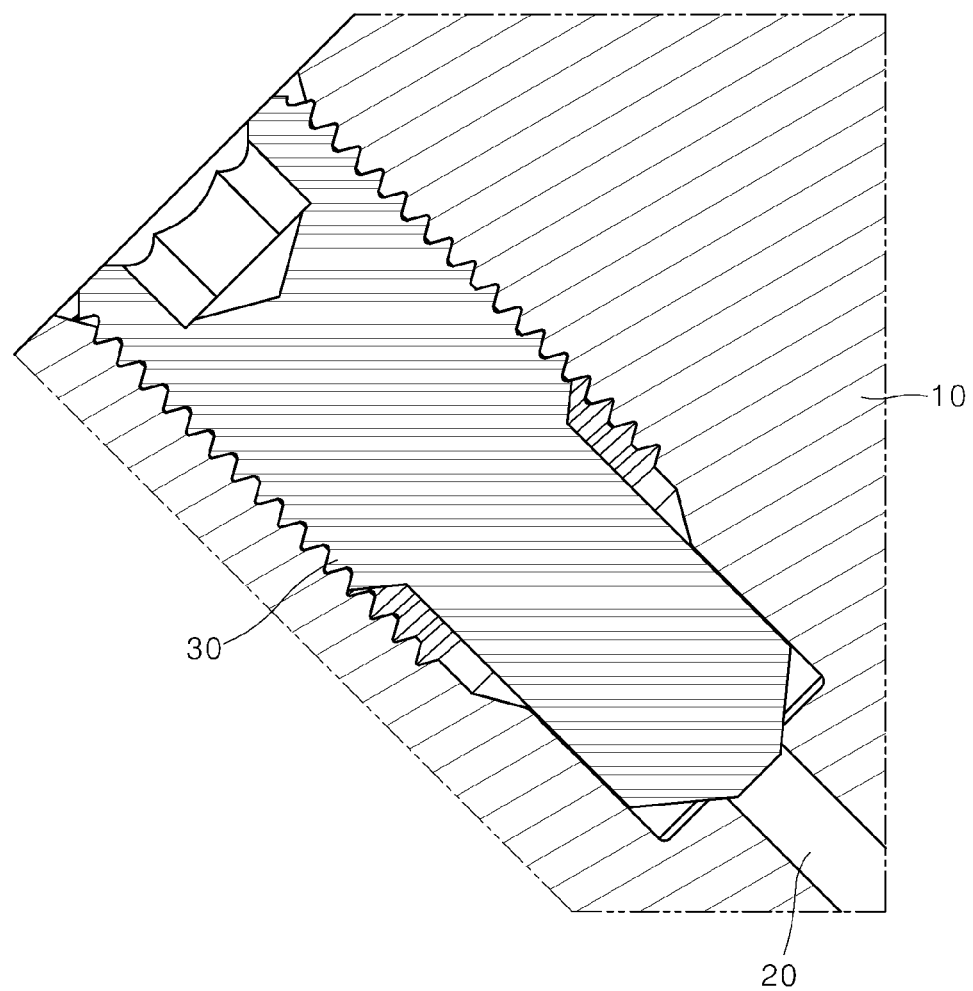

BREATHER VALVE

CROSS-REFERENCE TO RELATED APPLICATION

This application claims a priority benefit under 35 U.S.C. § 119(a) of Korean Patent Application No. 10-2019-0140130 filed on Nov. 5, 2019, the entire disclosure of which is incorporated herein by reference for all purposes.

BACKGROUND

1. Technical Field

The present disclosure relates to a breather valve disposed in a valve assembly for controlling charging and discharging hydrogen for a hydrogen fuel cell based vehicle. More specifically, the present disclosure relates to a breather valve that is used to remove pressure in a transfer channel to replace or repair an abnormal component such as a solenoid valve.

2. Description of Related Art

In general, in a hydrogen fuel cell based vehicle, energy is generated when electric current flows via reverse electrolysis due to reaction of hydrogen fuel and air. In this connection, hydrogen is transferred along a charging line of a hydrogen charging system and then is stored in a storage tank. The hydrogen stored in the storage tank is depressurized via a regulator and is supplied along a supply line to a cell stack to generate electrical energy.

A conventional hydrogen charging system has a very complicated configuration because a charging line for storing hydrogen in the storage tank and a supply line for supplying hydrogen in the storage tank to a cell stack are separately disposed.

However, due to the complicated configuration of the conventional hydrogen charging system, an amount of work increases and many parts are consumed when fitting pipes of the charging line and the supply line.

To solve this problem, a modularized valve assembly for controlling hydrogen charging and discharging for a vehicle has recently been developed.

The valve assembly for controlling hydrogen charging and discharging for the vehicle has functions of adjusting a flow rate of a to-be-charged fuel and a to-be-supplied fuel, controlling flow of the target charging fuel and the to-be-supplied fuel and controlling pressures thereof to prevent backflow, and manually regulating flow of the to-be-charged fuel and the to-be-supplied fuel. In this connection, the function to control the pressure of the fuel is implemented using a breather valve.

FIG. 3 shows a conventional breather valve disposed in a valve assembly to control hydrogen charging and discharging for a vehicle.

As shown in FIG. 3, a transfer channel 20 for charging and supply of the fuel is formed in a body 10 of the valve assembly for controlling hydrogen charging and discharging for a vehicle. A breather valve 30 for controlling pressure is disposed in the transfer channel 20.

The conventional breather valve 30 is embodied as a screw-type plug that is screw-coupled to the transfer channel 20. When a high pressure is applied to the transfer channel 20, a gap occurs between the assembly body 10 and the breather valve 30 due to backlash of a screw joint.

Further, when the assembly body 10 and the breather valve 30 are made of different materials, a gap occurs between the assembly body 10 and the breather valve 30 due to a difference between elongations thereof based on a temperature.

As described above, when the gap occurs between the assembly body 10 and the breather valve 30, there is a problem that the fuel in the transfer channel 20 leaks to an outside, thereby leading to a large accident such as an explosion.

A related prior art includes Korean Patent No. 10-0873244 (2008 Dec. 3).

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

A purpose of the present disclosure is to provide a breather valve having a structure capable of improving sealing properties with an assembly body, thereby preventing leakage of the fuel.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

A breather valve according the present disclosure to achieve the purpose controls a pressure of a transfer channel of a valve assembly to control charging and discharging hydrogen for a hydrogen fuel cell-based vehicle, wherein the breather valve has a vent ring movably disposed in the transfer channel and having a ventilation hole communicating with the transfer channel, and a vent valve that is screw-coupled to the transfer channel to open or close the ventilation hole.

In accordance with the present disclosure, the vent ring is in close contact with the vent valve due to the pressure of the transfer channel, thereby to reliably block the ventilation hole.

Therefore, it is possible to prevent the fuel of the transfer channel from leaking through the gap which may otherwise occur due to the backlash of the vent valve screw-coupled to the transfer channel, and the gap due to the deformation of the vent valve made of a different material from that of the assembly body.

In addition to the effects as described above, specific effects in accordance with the present disclosure will be described together with the detailed description for carrying out the disclosure.

BRIEF DESCRIPTION OF THE DRAWINGS

FIG. 1 is a schematic diagram of a valve assembly for controlling hydrogen charging and discharging for a vehicle including a breather valve according to one embodiment of the present disclosure.

FIG. 2 is a cross-sectional view of a breather valve according to one embodiment of the present disclosure.

FIG. 3 is a cross-sectional view of a breather valve based on a prior art.

DETAILED DESCRIPTION

For simplicity and clarity of illustration, elements in the figures are not necessarily drawn to scale. The same reference numbers in different figures represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A breather valve according to an embodiment of the present disclosure is disposed in a valve assembly for controlling hydrogen charging and discharging for a vehicle. The breather value controls a pressure of a transfer channel of the valve assembly.

Referring to FIG. 1, a valve assembly for controlling hydrogen charging and discharging for a vehicle including a breather valve will be described.

A valve assembly 1 for controlling hydrogen charging and discharging for a vehicle has a filling port 100 connected to a charging nozzle (not shown) and an engine (not shown), and a transfer channel 300 connecting the filling port 100 and the storage tank 200 with each other. A to-be-charged fuel and a to-be-supplied fuel are transferred along the transfer channel 300.

The filling port 100 stores external fuel in the storage tank 200 or supplies the stored fuel to a fuel cell stack (not shown). The filling port 100 may connect the charging nozzle and the storage tank 200 to each other when the fuel is charged. The filling port 100 may connect the storage tank 200 and the fuel cell stack to each other when the fuel is supplied.

For example, when a charging nozzle of an external fuel supply source is connected to the vehicle, fuel is injected through the filling port 100 and then charged to the storage tank 200. On the other hand, when driving the vehicle, the fuel in the storage tank 200 is supplied to the fuel cell stack via the filling port 100.

The storage tank 200 stores the fuel injected from the outside and at the same time supplies the fuel stored therein to the fuel cell stack when driving the vehicle. The storage tank 200 may be capable of storing high-pressure hydrogen fuel, and may be the same as or similar to a conventional storage tank used in a hydrogen based vehicle. Thus, detailed descriptions thereof will be omitted.

The transfer channel 300 is configured for connecting the filling port 100 and the storage tank 200 with each other. That is, when charging the fuel, the to-be-charged fuel is transferred from the filling port 100 to the storage tank 200 via the transfer channel 300. When supplying fuel, the to-be-supplied fuel is transferred from the storage tank 200 to the filling port 100.

In one example, along the transfer channel 300, a filter 400, a metering valve 500, a solenoid valve 600, a manual valve 700, and a breather valve 800 and a temperature-sensitive safety device 900 are installed.

The filter 400 serves to filter the to-be-charged fuel and the to-be-supplied fuel.

The metering valve 500 controls a flow rate due to a difference between a pressure of the to-be-charged fuel to be charged in the storage tank 200 via the transfer channel 300 and a pressure of the to-be-supplied fuel to be supplied to the fuel cell stack via the transfer channel 300.

The solenoid valve 600 operates based on an externally applied signal and opens or closes the transfer channel 300. That is, the solenoid valve 600 opens the transfer channel 300 when charging and supplying the fuel. The solenoid valve 600 is controlled such that the to-be-charged fuel and the to-be-supplied fuel may be transferred at a constant pressure. Further, the solenoid valve 600 closes the transfer channel 300 when the fuel is fully stored in the storage tank 200 to prevent fuel backflow.

The manual valve 700 is used for an operator to manually control flows of the to-be-charged fuel and the to-be-supplied fuel. For example, the manual valve 700 serves to forcibly block the flow of the fuel when the solenoid valve 600 fails.

The breather valve 800 serves to remove the pressure of the transfer channel 300 in order to replace or repair an abnormal part such as the solenoid valve 600.

The temperature-sensitive safety device 900 may discharge the fuel to the outside when a temperature of the transfer channel 300 rises above a preset value, thereby to regulate the temperature thereof.

A structure of the breather valve 800 will be described with reference to FIG. 2.

First, the transfer channel 300 is disposed in a body 10 of the valve assembly 1 (FIG. 1) for controlling hydrogen charging and discharging for the vehicle. One end of the transfer channel 300 is open toward the outside. A breather valve 800 is installed in the open end. The open end of the transfer channel 300 in which the breather valve 800 is installed includes a first channel 310 having a diameter larger than a diameter of the transfer channel 300 and a second channel 320 having a diameter larger than that of the first channel 310.

The breather valve 800 includes a vent ring 810 installed in the first channel 310 and a vent valve 820 and a vent plug 830 installed in the second channel 320. In this connection, the vent plug 830 is located between the vent ring 810 and the vent valve 820.

The vent ring 810 has a hollow spool shape that may be inserted into the first channel 310. Inside the vent ring 810, a ventilation hole 812 is formed along a central axis thereof. A groove 814 is formed along an outer circumferential surface of the vent ring 810.

The ventilation hole 812 is connected to the transfer channel 300 so that the fuel may be discharged to the outside when the pressure of the transfer channel 300 rises above a preset value. The ventilation hole 812 is opened or closed by the vent valve 820 screw-coupled to the second channel 320.

The above-described vent ring 810 is movably disposed in the first channel 310, and is positionally biased by a pressure of the transfer channel 300, and thus is in close contact with the vent valve 820. In this connection, the ventilation hole 812 has a diameter smaller than that of the transfer channel 300, so that the vent ring 810 may be positionally biased toward the vent valve 820 by the pressure of the transfer channel 300.

The groove 814 is inwardly recessed in the outer circumferential surface of the vent ring 810. The groove 814 receives therein an O-ring 842 sealing between the vent ring 810 and the transfer channel 300, and a backup ring 844

The O-ring 842 is an elastic ring having a circular cross section. The O-ring 842 is elastically deformed by the pressure of the transfer channel 300 and seals between the vent ring 810 and the transfer channel 300 when being in close contact with the vent ring 810 and the transfer channel 300.

The backup ring 844 has a rectangular cross section. The backup ring 844 serves to prevent the O-ring 842 from being damaged due to a high pressure.

The vent valve 820 has a multi-stages shaft shape screwed to the second channel 320. That is, the vent valve 820 is composed of a relatively large diameter valve body 822 and a rod 824 having a smaller diameter than that of the valve body 822.

A thread is formed on an outer circumferential surface of the valve body 822 so that the vent valve 820 may be screwed to the second channel 320. Further, in an end of the valve body 822, a tool groove 826 is defined into which a tool for screwing the vent valve 820 to the second channel is inserted.

The rod 824 extends from one end of the valve body 822 and penetrates the vent plug 830. A tip of the rod 824 passing through the vent plug 830 has a tapered shape that a diameter decreases toward a distal end, thereby to open or close the ventilation hole 812.

The vent plug 830 has a pipe shape screwed to the second channel 320. The vent plug 830 is hollow so that the rod 824 may pass therethrough. An outer thread is formed on an outer face thereof. The vent plug 830 is located between the vent ring 810 and the vent valve 820 to limit movement of the vent ring 810.

The breather valve 800 having the above-described configuration is installed in the end 310 and 320 of the transfer channel 300 to prevent the fuel of the transfer channel 300 from leaking or being discharged in an untended manner. That is, the vent ring 810 is positionally biased toward the vent valve 820 by the pressure of the transfer channel 300. Accordingly, the tip of the rod 824 is in close contact with the ventilation hole 812 to seal the ventilation hole 812, thereby preventing the fuel leakage.

Therefore, the fuel may be reliably prevented from leaking through a clearance due to the backlash of the vent valve 820 screwed to the end 310 and 320 of the transfer channel 300, and the clearance due to the deformation of the vent valve 820 made of a different material from that of the assembly body 10.

For example, when a pressure of 1050 bar is applied to the transfer channel 300, a force applied to a lower end of the vent ring 810 is 727 N, and a force applied to a tip of the rod 824 is 181 N. Thus, a force of 546 N allows the vent ring 810 and the vent valve 820 to be close contact with each other, thereby to seal the ventilation hole 812.

As described above, the present disclosure has been described with reference to the exemplified embodiments and the drawings, but the present disclosure is not limited to the embodiments and the drawings disclosed in the present specification. It is obvious that various modifications may be made by those skilled in the art within the scope of the present disclosure.

What is claimed is:

1. A breather valve for controlling a pressure of a transfer channel of a valve assembly, wherein the valve assembly controls charging and discharging of hydrogen in a hydrogen fuel cell-based vehicle, wherein the breather valve comprises:
   a vent ring movably received in a distal portion of the transfer channel and having a ventilation hole communicating with a main portion of the transfer channel; and
   a vent valve received in the distal portion of the transfer channel and screw-coupled to the transfer channel to open or close the ventilation hole,
   wherein the vent ring is positionally biased by a pressure of the transfer channel and thus is in close contact with the vent valve, thereby to block the ventilation hole.

2. The breather valve of claim 1, wherein the breather valve further comprises a vent plug received in the distal portion of the transfer channel and screw-coupled to the transfer channel and disposed between the vent ring and the vent valve to restrict movement of the vent ring, wherein the vent valve passes through the vent plug.

3. The breather valve of claim 2, wherein the ventilation hole has a smaller diameter than a diameter of the main portion the transfer channel.

4. The breather valve of claim 3, wherein the vent ring has a spool-shaped structure having a groove defined along and in an outer circumferential face thereof, wherein an O-ring for sealing the transfer channel and a backup ring are received in the groove.

5. The breather valve of claim 4, wherein the vent valve includes:
   a valve body screw-coupled to the transfer channel; and
   a rod extending from an end of the valve body and passing through the vent plug and then contacting the ventilation hole,
   wherein a tip of the rod has a tapered shape in which a diameter thereof decreases toward the ventilation hole.

* * * * *